3,371,108
HALOGENATED BICYCLIC ACID KETO ESTERS
Israel J. Dissen, Chicago, Ill., assignor to Velsicol Chemical Corporation, Chicago, Ill., a corporation of Illinois
No Drawing. Filed Aug. 21, 1964, Ser. No. 391,312
5 Claims. (Cl. 260—468)

This invention relates to new compositions of matter. More particularly, the present invention relates to new halogenated bicyclic acid keto esters useful as plasticizers, especially as plasticizers for vinyl resins.

The compounds of the present invention have the structure:

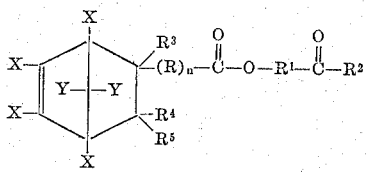

wherein X is selected from the group consisting of chlorine, bromine and fluorine; Y is selected from the group consisting of hydrogen, chlorine, bromine and fluorine; $n$ is an integer from 0 to 1; R and $R^1$ are alkylene groups containing from one to ten carbon atoms; $R^2$ is an alkyl group containing from one to ten carbon atoms; $R^3$ and $R^4$ are independently selected from the group consisting of hydrogen and an alkyl group containing from one to ten carbon atoms; and $R^5$ is independently selected from the group consisting of hydrogen, an alkyl group containing from one to ten carbon atoms and

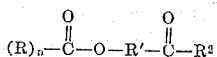

wherein R, $R^1$, $R^2$, and $n$ are as defined above.

The compositions of the present invention are useful as plasticizers, particularly for vinyl resins. These new compositions when used as plasticizers, impart flame and fire retardance to the final resin composition or end product.

Therefore, it is one object of the present invention to prepare new compositions of matter useful in the production of products of vinyl resins.

Another object of the present invention is the preparation of new halogenated compositions of matter.

Another object of this invention is to provide plasticizers for vinyl resins.

Still another object of this invention is to provide plasticizers for vinyl resins which impart flame and fire retardance to the resin composition.

These and other objects and advantages of the present invention will become apparent from the ensuing description.

The compositions of the present invention are remarkably effective as plasticizers when mixed with thermoplastic resins, such as polyvinyl chloride, chlorinated polyethylene, polyvinyl acetate, vinyl chloride-vinylidene chloride copolymers, and the like. This effectiveness is believed to be due at least in part to the presence of the keto group on the alcohol portion of the esters of the present invention. The compositions of the present invention can be added in an amount ranging between 10-120% by weight based on the weight of the resin.

The compounds of the present invention can be readily prepared from an aliphatic keto alcohol and a polyhalogenated norbornene acid. The two ingredients are esterified to form the compounds of the present invention. The esterification is preferably performed in the presence of an esterification catalyst, and most preferably in the presence of acid catalysts such as para-toluene sulfonic acid, sulfuric acid, hydrochloric acid, boron-trifluoride, aluminum trichloride and the like. Although the esterification will take place in the absence of the catalyst, the rate is slow and hence the use of catalyst is preferred. Only catalytic amounts of catalyst such as from 0.005% to about 5% by weight of the reactants, are required to accelerate the reaction. The esterification proceeds with the formation of water. It is preferred to remove the water as it is formed by suitable means, such as by azeotroping a mixture of the water with an organic substance in which the water is relatively immiscible. For this purpose it is preferred to employ a suitable quantity of an organic liquid, such as toluene, xylene, benzene, heptane, and the like, and perform the esterification at reflux so as to remove the water as it is formed.

Alternatively, the compounds of the present invention can be readily prepared by first esterifying the aliphatic keto-alcohol with an unsaturated acid, and then adducting the resulting unsaturated ester or diester with the appropriate halogenated cyclopentadiene. As in the first method, the esterification is preferably performed in the presence of an esterification catalyst, most preferably an acid catalyst, such as those heretofore described. An organic liquid is also preferably employed to aid in removing water formed during the esterification reaction. The adduction reaction can be preformed by heating the halogenated cyclopentadiene with the unsaturated ester of diester in the manner described for the preparation of the norbornene acid.

The compounds of the present invention can also be prepared readily by first preparing the acid chloride of the polyhalogenated norbornene acid, and then reacting the acid chloride with the aliphatic keto alcohol. The acid chloride of the polyhalogenated norbornene acid can be prepared readily by reacting the acid with a suitable chlorinating agent, such as phosphorus pentachloride, and removal of by-product oxychlorides. The acid chloride and the aliphatic keto alcohol react in the manner heretofore described with heating and the removal of water as it is formed.

Suitable norbornene acids which can be employed in the manner described above can be readily prepared by reacting a polyhalogenated cyclopentadiene with an unsaturated acid in a Diels-Alder adduction, as described by Prill, J.A.C.S. vol. 69, p. 62 (1947). Suitable halogenated cyclopentadiene ingredients are hexachlorocylopentadiene, pentachlorocyclopentadiene, tetrachorocyclopentadiene, hexabromocyclopentadiene, pentabromocyclopentadiene, tetrabromocyclopentadiene, hexafluorocyclopentadiene, 5,5-difluorotetrachlorocyclopentadiene, and the like. Exemplary of the suitable unsaturated acid and diacids or anhydrides thereof, which can be adducted with the polyhalogenated cyclopentadienes to yield the norbornene ingredient, or first esterified and then adducted, to form the desired compounds of this invention, are: acrylic acid, crotonic acid, vinylacetic acid, angelic acid, tiglic acid, 3-pentenoic acid, allylacetic acid, undecylinic acid, oleic acid, maleic acid, citraconic acid, cis-glutaconic acid, and the like.

Aliphatic keto alcohols which can be utilized in the preparation of the compounds of the present invention are exemplified by: pyruvic alcohol, 4 - hydroxy - 3-butanone, 4 - hydroxy - 2 - butanone, 4 - hydroxy - 3-methyl - 2 - butanone, 4 - hydroxy - 2 - pentanone, 4-hydroxy - 4 - methyl - 2 - pentanone, 4 - hydroxy - 3-methyl - 2 - pentanone, 5 - hydroxy - 2 - pentanone, 6-hydroxy-2-hexanone, and the like.

The following examples are set forth to illustrate but not limit the preparation of the compounds of the present invention, and in each example there can be substituted therein other reactants within the previously described scope of the invention.

EXAMPLE 1

*Preparation of 1,2,3,4,7,7-hexachloro-2-norbornen-5,6-dicarbonyl chloride*

Chlorendic acid (1,2,3,4,7,7-hexachloro-2-norbornen-5,6-dicarboxylic acid) (371 g.; 1.0 mol.) and phosphorus pentachloride (260 g.; 1.25 moles) were placed into a one liter, three-neck, round-bottom flask equipped with a mechanical stirrer, internal thermometer and reflux condenser attached to a Dean-Stark tube. The flask was heated and the temperature of the contents increased to about 100° C. where the contents became liquid. The contents of the flask were maintained at reflux (150° C.) by drawing off by-product phosphorus oxychloride from the Dean-Stark tube. After the contents of the flask began to darken, the heating was stopped, and the contents allowed to cool. Phosphorus oxychloride was removed from the reaction mixture by heating to 120° C. under vacuum created by a water aspirator. The reaction mixture was distilled in vacuo and 1,2,3,4,7,7-hexachloro-2-norbornen-5,6-dicarbonyl chloride was collected as the distillate, distilling at 150–160° C. at about 1 mm. mercury pressure.

EXAMPLE 2

*Preparation of bis (3-ketobutyl) 1,2,3,4,7,7-hexachloro-2-norbornen-5,6-dicarboxylate*

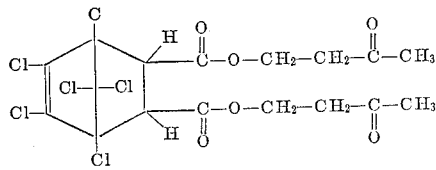

Anhydrous sodium carbonate (170 g.; 1.6 moles), anhydrous magnesium sulfate (100 g.; 0.8 mol), 1,2,3,4,7,7 - hexachloro - 2 - norbornen-5,6-dicarbonyl chloride (170.4 g.; 0.4 mol), prepared in Example 1, and benzene (600 ml.) were placed in a one liter, three-neck, round-bottom flask equipped with a mechanical stirrer, internal thermometer, reflux condenser and dropping funnel. 4-hydroxy-2-butanone (17.6 g.; 0.2 mol) was charged to the dropping funnel. The contents of the flask were heated to 80° C. and the 4-hydroxy-2-butanone added to the flask dropwise. After most of the 4-hydroxy-2-butanone was added, the reaction mixture began to foam, and had to be alternately cooled and warmed several times in order to control the foaming. The reaction mixture was maintained at 70°–80° C. for about ½ hour after the addition was complete. The mixture was then cooled and the solid precipitate filtered off. The filtrate was washed twice with water and then with aqueous sodium bicarbonate solution, and dried over anhydrous magnesium sulfate. Benzene was removed from the filtrate by heating on a steam bath in vacuo leaving as a dark yellow liquid the desired product bis(3-ketobutyl) 1,2,3,4,7,7 - hexachloro - 2-norbornen-5,6-dicarboxylate. The product was dissolved in diethyl ether, washed twice with sodium carbonate, and dried. The diethyl ether was removed by heating on a steam bath in vacuo, leaving the purified compound as a yellow liquid having a refractive index of 1.5264 at 23.8° C.

EXAMPLE 3

*Preparation of 3-ketobutyl 1,2,3,4,7,7-hexachloro-2-norbornen-5-carboxylate*

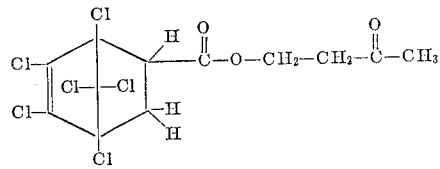

Anhydrous sodium carbonate (170 g.; 1.6 moles), anhydrous magnesium sulfate (100 g.; 0.8 mol), 4-hydroxy-2-butanone (35 g.; 0.1 mol) and benzene (300 ml.) are charged to the flask described in the previous example. 1,2,3,4,7,7 - hexachloro-2-norbornen-5-carbonyl chloride (145 g.; 0.4 mol) prepared from 1,2,3,4,7,7-hexachloro-2-norbornen-5-carboxylic acid as described in Example 1, dissolved in benzene (300 ml.) is placed in the dropping funnel and added dropwise to the flask after the contents have been heated to about 80° C. Upon completion of the addition the reaction mixture is maintained at 70°–80° C. for about ½ hour, after which the reaction mixture is cooled, and the precipitate filtered off. The filtrate is washed with water and aqueous sodium bicarbonate solution, and dried over anhydrous magnesium sulfate. Benzene is removed from the filtrate by heating on a steam bath in vacuo leaving 3-ketobutyl 1,2,3,4,7,7-hexachloro-2-norbornen-5-carboxylate, as the residue.

The procedure detailed in the above examples can be utilized to prepare other compounds within the scope of the invention. Given in the examples below are the necessary reactants from which the named compounds of the present invention can be prepared. The first reactant is the diene which is reacted with the unsaturated acid reactant yielding the norbornene acid which can be reacted with the third reactant, the keto alcohol, either directly or through the acid chloride, to form the named compound.

EXAMPLE 4

Tetrachlorocyclopentadiene+acrylic acid+4-hydroxy-2-butanone=3-ketobutyl 1,2,3,4-tetrachloro-2-norbornen-5-carboxylate.

EXAMPLE 5

Pentachlorocyclopentadiene+acrylic acid+4-hydroxy-2-butanone=3-ketobutyl 1,2,3,4,7-pentachloro-2-norbornen-5-carboxylate.

EXAMPLE 6

Hexachlorocyclopentadiene+acrylic acid+4-hydroxy-2-pentanone=3-keto-1-methylbutyl 1,2,3,4,7,7-hexachloro-2-norbornen-5-carboxylate.

EXAMPLE 7

Hexabromocyclopentadiene+acrylic acid+4-hydroxy-2-butanone=3-ketobutyl 1,2,3,4,7,7-hexabromo-2-norbornen-5-carboxylate.

EXAMPLE 8

Hexachlorocyclopentadiene+crotonic acid+pyruvic alcohol=2 - ketopropyl 1,2,3,4,7,7-hexachloro-6-methyl-2-norbornen-5-carboxylate.

EXAMPLE 9

Hexachlorocyclopentadiene+vinylacetic acid+4 - hydroxy-2-butanone=3-ketobutyl 1,2,3,4,7,7-hexachloro-2-norbornen-5-acetate.

EXAMPLE 10

Tetrachlorocyclopentadiene+3-pentenoic acid+4 - hydroxy - 2 - butanone=3-ketobutyl 1,2,3,4-tetrachloro-6-methyl-2-norbornen-5-acetate.

EXAMPLE 11

Tetrabromocyclopentadiene+allylacetic acid+4 - hydroxy - 4-methyl-2-pentanone=3-keto-1,1-dimethylbutyl 1,2,3,4-tetrabromo-2-norbornen-5-propionate.

EXAMPLE 12

Hexabromocyclopentadiene+maleic acid+4-hydroxy-2-butanone=bis(3-ketobutyl) 1,2,3,4,7,7-hexabromo-2-norbornen-5,6-dicarboxylate.

EXAMPLE 13

Pentachlorocyclopentadiene+maleic acid+4-hydroxy-2-pentanone=bis(3-keto-1-methylbutyl) 1,2,3,4,7-pentachloro-2-norbornen-5,6-dicarboxylate.

EXAMPLE 14

Tetrachlorocyclopentadiene+maleic acid+5-hydroxy-2-pentanone=bis(4-ketopentyl) 1,2,3,4-tetrachloro-2-norbornen-5,6-dicarboxylate.

EXAMPLE 15

Hexachlorocyclopentadiene+citraconic acid+4-hydroxy-2-butanone=bis(3-ketobutyl) 1,2,3,4,7,7-hexachloro-5-methyl-2-norbornen-5,6-dicarboxylate.

The following example ilustrates the effectiveness of the compounds of the present invention as a plasticizer for vinyl resins. The plasticized resin thus obtained possesses flame retardant properties due to the compounds of this invention. Although a specific compound of the present invention is utilized in Example 16, other compounds within the scope of the present invention can be successfully substituted therefor.

EXAMPLE 16

*Use of the compounds of the present invention as a plasticizer*

Polyvinyl chloride resin "Marvinol VR-23" marketed by the United States Rubber Company (100 parts), product of Example 1 (50 parts) and a barium-cadmium stabilizer (2.5 parts) are roll milled at 300° F. and pressed into a sheet at 350° F. The sheet thus obtained possesses desirable hardness, tensile strength, heat stability, in addition to the fire resistance required for many vinyl resin applications.

The compounds of the present invention are also useful in numerous other applications, such as a lubrication oil additive, as a hydraulic fluid, as a solvent for resins, as a biocide, particularly as an insecticide, and as an intermediate in the production of numerous compounds, such as nitroso compounds, ketals and the like.

I claim:
1. A compound of the formula

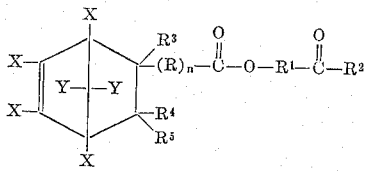

wherein X is selected from the group consisting of chlorine, bromine and fluorine; Y is selected from the group consisting of hydrogen, chlorine, bromine and fluorine; $n$ is an integer from 0 to 1; R and $R^1$ are alkylene groups containing from one to ten carbon atoms; $R^2$ is an alkyl group containing from one to ten carbon atoms; $R^3$ and $R^4$ are independently selected from the group consisting of hydrogen and an alkyl group containing from one to ten carbon atoms; and $R^5$ is independently selected from the group consisting of hydrogen, an alkyl group containing from one to ten carbon atoms and

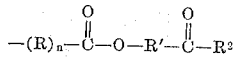

wherein R, $R^1$, $R^2$ and $n$ are as described above.

2. Bis(3-ketobutyl) 1,2,3,4,7,7-hexachloro-2-norbornen-5,6-dicarboxylate.

3. 3-ketobutyl 1,2,3,4,7,7-hexachloro-2-norbornen-5-carboxylate.

4. Bis(3-ketobutyl) 1,2,3,4,7,7-hexabromo-2-norbornen-5,6-dicarboxylate.

5. 3-ketobutyl 1,2,3,4,7,7-hexachloro-2-norbornen-5-acetate.

References Cited

UNITED STATES PATENTS 3,278,580  10/1966  Worsley _____ 260—468

LORRAINE A. WEINBERGER, *Primary Examiner.*

P. J. KILLOS, *Assistant Examiner.*

UNITED STATES PATENT OFFICE
CERTIFICATE OF CORRECTION

Patent No. 3,371,108                          February 27, 1968

Israel J. Dissen

It is certified that error appears in the above identified patent and that said Letters Patent are hereby corrected as shown below:

Column 1, lines 33 and 34, and column 6, lines 3 to 9, for that portion of the formulas reading $$-O-R'-\overset{\overset{O}{\|}}{C}-$$      read      $$-O-R^1-\overset{\overset{O}{\|}}{C}-$$

Signed and sealed this 22nd day of July 1969.

(SEAL)
Attest:

Edward M. Fletcher, Jr.                 WILLIAM E. SCHUYLER, JR.
Attesting Officer                         Commissioner of Patents